(12) United States Patent
Cherubini et al.

(10) Patent No.: US 7,742,254 B2
(45) Date of Patent: Jun. 22, 2010

(54) SERVO CHANNEL FOR TAPE DRIVE SYSTEMS

(75) Inventors: Giovanni Cherubini, Rueschlikon (CH); Roy Daron Cideciyan, Rueschlikon (CH); Evangelos S. Eleftheriou, Rueschlikon (CH); Robert Allen Hutchins, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 11/969,184

(22) Filed: Jan. 3, 2008

(65) Prior Publication Data

US 2009/0174964 A1 Jul. 9, 2009

(51) Int. Cl.
*G11B 5/584* (2006.01)
(52) U.S. Cl. .................................... 360/77.12
(58) Field of Classification Search .............. 360/77.12, 360/73.12, 77.14, 77.08, 39, 46, 51, 68
See application file for complete search history.

(56) References Cited

U.S. PATENT DOCUMENTS

| | | | |
|---|---|---|---|
| 4,172,267 A | 10/1979 | Sidman | |
| 5,453,888 A | 9/1995 | Tsunoda et al. | |
| 6,445,522 B1 | 9/2002 | Tsunoda et al. | |
| 7,245,450 B1 * | 7/2007 | Cherubini et al. | 360/73.12 |
| 7,365,929 B2 * | 4/2008 | Cherubini et al. | 360/73.12 |
| 7,433,142 B2 * | 10/2008 | Bui et al. | 360/46 |
| 2005/0270686 A1 | 12/2005 | Kisaka | |
| 2006/0132950 A1 | 6/2006 | Feller | |

OTHER PUBLICATIONS

R.C. Barrett, et al., "Timing-Based Track-Following Servo for Linear Tape Systems", IEEE Transactions on Magnetics, vol. 34, No. 4, Jul. 1998, pp. 1872-1877.
"Ultrium LTO", 1999, pp. 1-3, [online] [retrieved Dec. 17, 2007] http://www.ultrium.com/default.php.
US Patent Application entitled "Synchronous Servo Channel for Tape Drive Systems", U.S. Appl. No. 11/460,987, filed Jul. 30, 2006 by inventors G. Cherubini, E. Eleftheriou, R. Hutchins and J. Jelitto.

* cited by examiner

*Primary Examiner*—Fred Tzeng
(74) *Attorney, Agent, or Firm*—Janaki K. Davda; Konrad Raynes & Victor LLP

(57) ABSTRACT

Provided are techniques for synchronous servo channel for a data tape drive. A servo reader is configured to read servo bursts from a data tape. An anti-aliasing filter is operable to output a bandlimited signal and is coupled to receive a servo channel signal comprising servo bursts from the servo reader. An analog-to-digital converter (ADC) is operable to output signal samples and is coupled to receive the bandlimited signal from the anti-aliasing filter. An interpolation and control unit is operable to output interpolated signal samples and control signals, has a first input coupled to receive the signal samples from the ADC, and has a second input coupled to receive the correlation signal samples from the dibit correlator. A dibit correlator is operable to output correlation signal samples and is coupled to receive the interpolated signal samples and control signals from the interpolation and control unit.

20 Claims, 12 Drawing Sheets

SERVO CHANNEL FOR TAPE DRIVE SYSTEMS

BACKGROUND

1. Field

Embodiments of the invention relate to a servo channel for tape drive systems.

2. Description of the Related Art

In timing-based servo (TBS) systems, recorded servo patterns consist of magnetic transitions with two different azimuthal slopes. Head position is derived from the relative timing of pulses, or dibits, generated by a narrow head reading the servo patterns. TBS patterns also allow the encoding of additional longitudinal position (LPOS) information without affecting the generation of the transversal position error signal (PES). This is obtained by shifting transitions from their nominal pattern position using pulse-position modulation (PPM). A specification for the servo format in current tape drives is provided by the linear tape-open (LTO) format. The complete format for LTO drives of generation 1 (LTO-1) was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified, can be found on the World Wide Web (www) at ultrium.com. Traditionally, the detection of LPOS information bits is based on the observation of the arrival times of the shifted dibit peaks within the servo bursts at the servo reader output (R. C. Barrett, E. H. Klaassen, T. R. Albrecht, G. A. Jaquette, and J. H. Eaton, "Timing-based track-following servo for linear tape systems", IEEE Transactions on Magnetics, Vol. 34, Issue 4, Part 1, pp. 1872-1877, July 1998). In an alternative solution, optimum detection of LPOS bits is performed by a matched-filter detector (G. Cherubini, E. Eleftheriou, R. Hutchins, and J. Jelitto, "Synchronous Servo Channel for Tape Drive Systems," Filed as IBM Docket TUC920060028US1, Jul. 30, 2006).

In certain prior-art architectures, however, estimates of the lateral servo reader position (y-position) and tape velocity are directly obtained by monitoring the peak-arrival times or the zero-crossing instants of the dibits of the servo bursts. The filtering for the servo reader signal used for the computation of the estimates is typically achieved by an anti-aliasing low-pass filter (LPF) in the analog domain, prior to analog-to-digital conversion. Unfortunately, at low tape velocities a fixed low-pass filter exhibits significant excess bandwidth, which leads to a large noise level, and may greatly reduce the reliability of the computed estimates, depending on the tape velocity.

The minimum (Nyquist) bandwidth of the servo reader signal is about $v_x/s$, where "$v_x$" denotes the tape velocity and "s" denotes the minimum distance between magnetic transitions of the recorded servo patterns. To mitigate the excess noise problem, in current tape drives the clock frequency of the analog-to-digital converter (ADC) sampling the servo reader signal is selected from a finite set of frequencies, which are generated by a phase-locked loop. This approach has the requirement that the bandwidth of the anti-aliasing filter be selectable, which leads to increased complexity. A further disadvantage arises if the bandwidth of the servo reader signal for the minimum cruise velocity of the tape is significantly smaller than the minimum available clock frequency of the ADC. In this case, which is found in practice, excess noise bandwidth cannot be eliminated at low tape velocities. Another drawback of this approach is that a variable clock rate would be required during tape acceleration and deceleration to guarantee minimum-bandwidth filtering.

A possible solution to the excess noise problem is represented by the inclusion of a filter, either in the analog or in the digital domain, with a variable bandwidth proportional to the tape velocity. Thus, the noise spectral components above the Nyquist frequency are eliminated without aliasing of the servo reader signal, which carries the relevant information for the track-following and reel-to-reel servo systems of the tape drive. Such a solution, however, leads to a significant increase in the complexity of the implementation of the servo channel. In fact, the variable-bandwidth filter should not only accommodate the various signal bandwidths associated with the cruise velocities of the tape, but should also be able to continuously vary the servo-reader signal bandwidth during tape acceleration and deceleration. FIG. 1 illustrates an architecture of a servo channel 100 according to the prior art, including a digital filter with variable bandwidth 112 to eliminate out-of-band noise spectral components. In particular, in FIG. 1, an anti-aliasing filter 102 receives input from a servo reader (not shown). The output of the anti-aliasing filter 102 is routed to an ADC 110 in the servo channel 100.

The output of the ADC goes into a variable-bandwidth low-pass filter 112. The variable-bandwidth LPF 112 varies bandwidth based on velocity to obtain optimal filtering. The output of the variable-bandwidth LPF 112 is routed to a servo channel signal interpolator 114 (also referred to as an "interpolator"), a monitoring and control component 116, a peak-arrival time component 118, and a zero-crossing time component 120. The output of the interpolator 114 is routed to the matched-filter LPOS detector 122 and the monitoring and control component 116. The output of the monitoring and control component 116 is routed to a time-base generator 124, to the matched-filter LPOS detector 122, to the peak-arrival time component 118, and to the zero-crossing time component 120.

Notwithstanding conventional solutions, there is a need in the art for velocity-independent optimum filtering of servo-reader signals in tape drive systems by a servo channel, which allows reliable recovery of longitudinal position information as well as estimation of tape velocity and head lateral position even during tape acceleration and deceleration.

SUMMARY OF EMBODIMENTS OF THE INVENTION

Provided are a method, computer program product, and system for a synchronous servo channel for a data tape drive. A servo reader is configured to read servo bursts from a data tape. An anti-aliasing filter is operable to output a bandlimited signal and is coupled to receive a servo channel signal comprising servo bursts from the servo reader. An analog-to-digital converter (ADC) is operable to output signal samples and is coupled to receive the bandlimited signal from the anti-aliasing filter. An interpolation and control unit is operable to output interpolated signal samples and control signals, has a first input coupled to receive the signal samples from the ADC, and has a second input coupled to receive the correlation signal samples from the dibit correlator. A dibit correlator is operable to output correlation signal samples and is coupled to receive the interpolated signal samples and control signals from the interpolation and control unit.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments provide a new architecture, in which the excess noise problem in the servo reader signal, which exhibits a bandwidth that depends on tape velocity, is solved without resorting to a low-pass filter with variable cutoff frequency. The need for a variable-bandwidth low-pass filter is avoided by introducing an interpolator/dibit correlator, which is included in a synchronous servo channel prior to servo reader y-position estimation, tape velocity estimation, signal-to-distortion ratio estimation and LPOS symbol detection.

Figure 1:
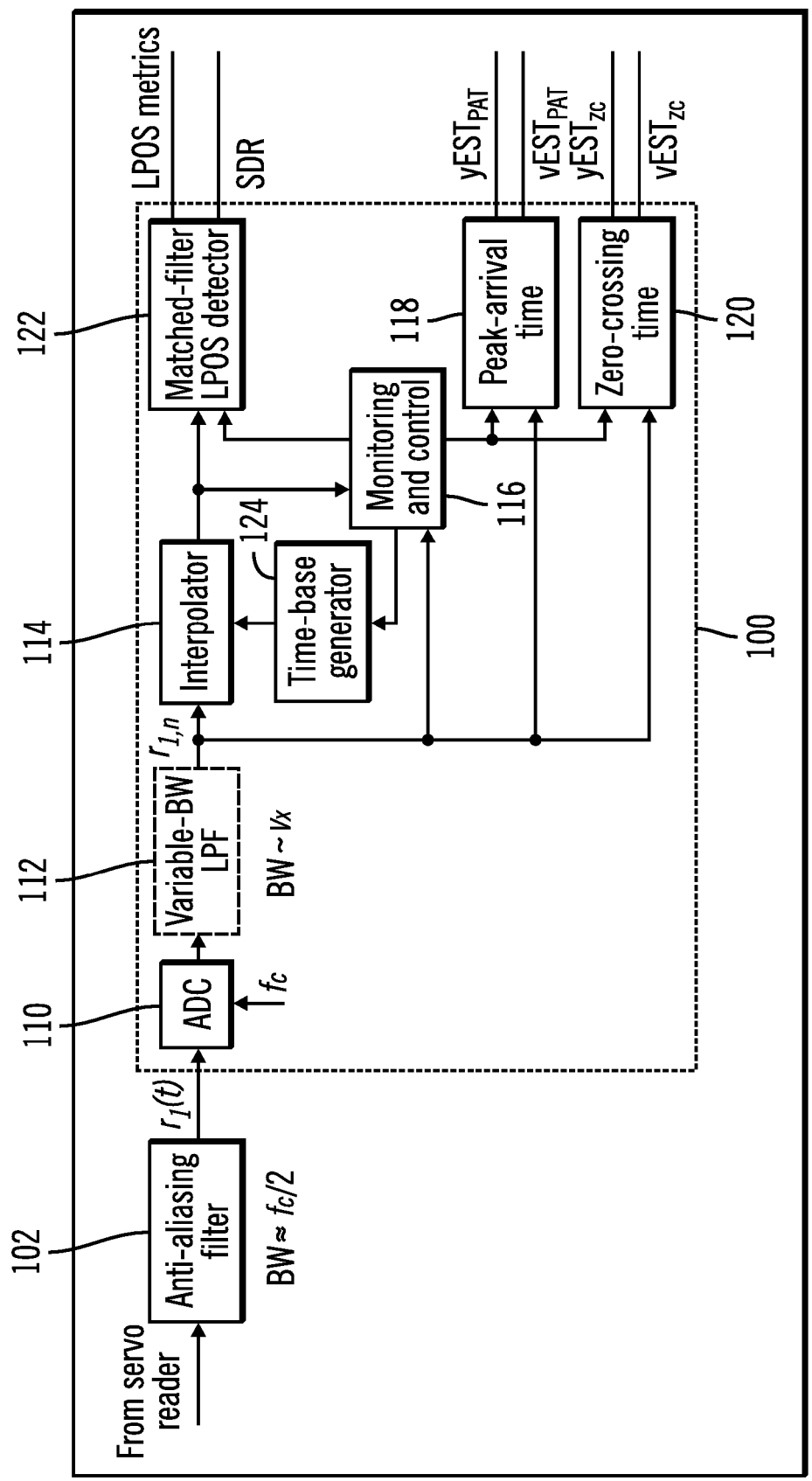
FIG. 1 illustrates an architecture of a servo channel according to the prior art, including a digital filter with variable bandwidth to eliminate out-of-band noise spectral components.
Figure 2:
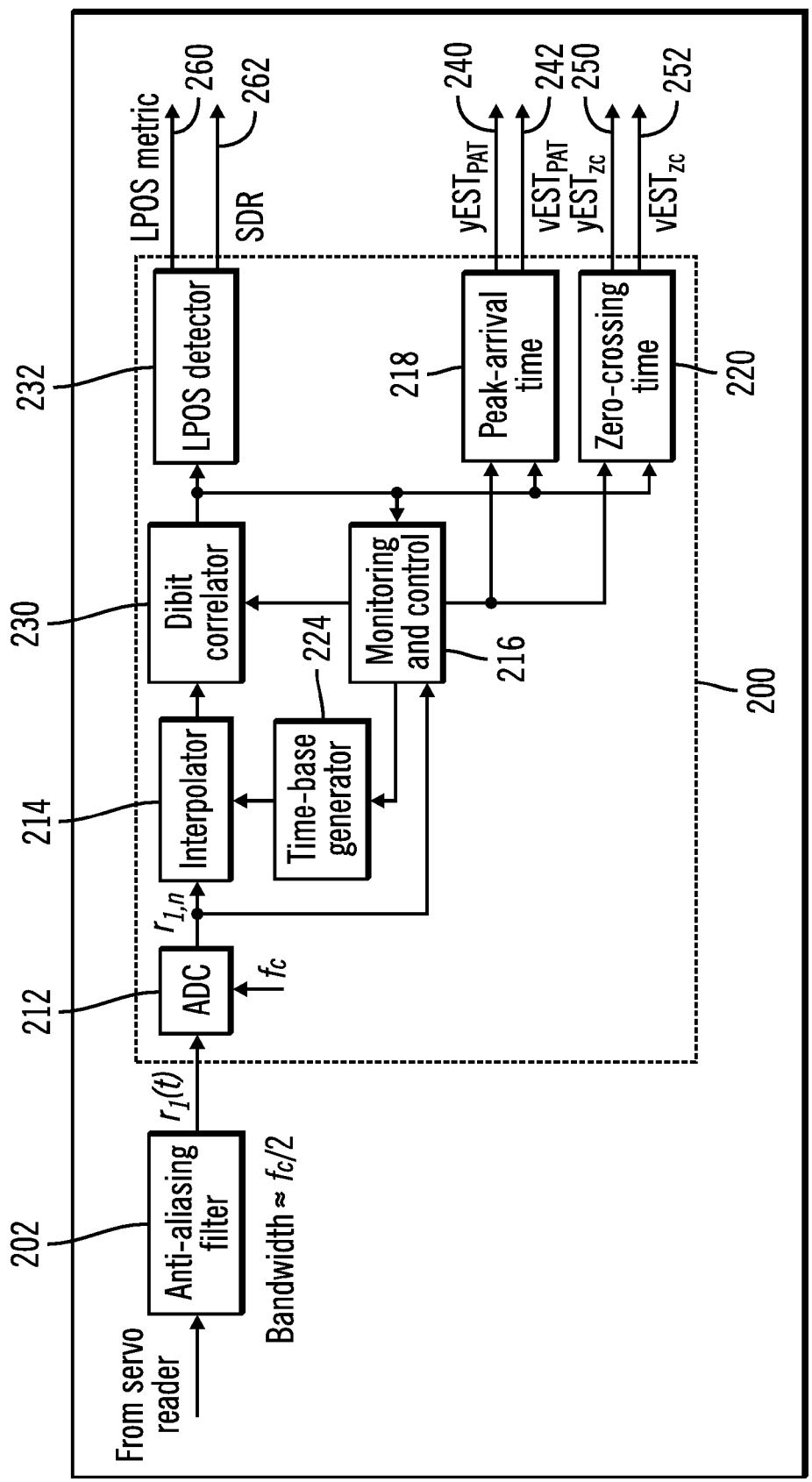
FIG. 2 illustrates a new synchronous servo channel architecture with an interpolator/dibit correlator in accordance with certain embodiments.

FIG. 2 illustrates a new synchronous servo channel architecture with an interpolator/dibit correlator in accordance with certain embodiments. An anti-aliasing filter 202 receives input from a servo reader (not shown). The output of the anti-aliasing filter 202, which is a bandlimited signal, is routed to an ADC 212 with a fixed clock frequency $f_c$ in the servo channel 200. The output of the ADC 212 is a sequence of signal samples that are routed to an interpolator 214 and to a monitoring and control component 216. The monitoring and control component 216 processes the sequence of signal samples from the ADC 212 at start-up to acquire initial servo channel parameters for proper operation of the servo channel 200 in tracking mode, e.g., tape velocity and reader y-position estimates, as well as an initial instant for time-base generation. The output of the interpolator 214 is a sequence of interpolated servo signal samples (also referred to as "interpolated signal samples") that are routed to a dibit correlator 230. The output of the dibit correlator 230 is a sequence of signal samples (also referred to as "correlation signal samples") that are routed to an LPOS detector 232, a peak-arrival time component 218, a zero-crossing time component 220, and the monitoring and control component 216. The monitoring and control component 216 outputs control signals that are routed to the time-base generator 224, the dibit correlator 230, the peak-arrival time component 218, and the zero-crossing time component 220. The output of the time-base generator 224 consists of a plurality of signals including timing information that are routed to the interpolator 214.

The definition of the dibit correlator 230 (i.e., a digital dibit correlator) derives from the finite impulse response of the correlator, which is given by samples of a reference dibit waveform g(t) (examples of dibit waveforms are given in FIGS. 8 and 9, which will be described below).

Figure 3:
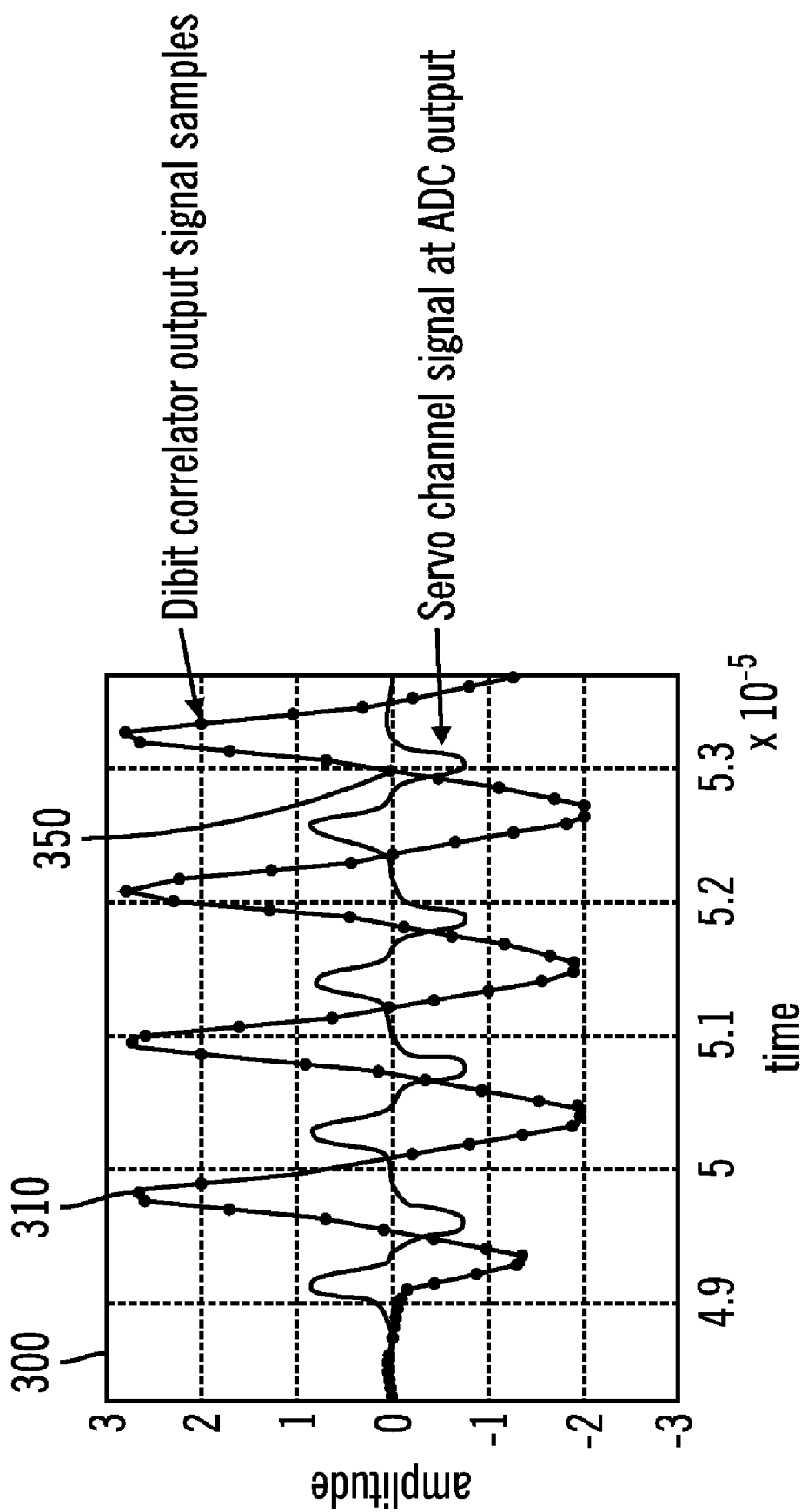
FIG. 3 illustrates a graph showing dibit correlator output signal samples in accordance with certain embodiments.

The dibit correlator 230 output at time $t_n$ is given by $$c(t_n) = \sum_{i=0}^{N-1} r(t_{n-i}) g_{N-1-i}, \quad (1)$$

where $\{r(t_n)\}$ is the sequence of interpolated signal samples, $\{t_n\}$ is the sequence of time instants provided by the time-base generator, and $\{g_i\}_{i=0}^{N-1}$ is the sequence of length N representing the sampled reference dibit waveform. To achieve synchronous operation of the servo channel, the generation of the time base for signal interpolation has the objective to yield signal samples at the interpolator output at a predetermined fixed rate of $1/x_{int}$ samples per micrometer, where $x_{int}$ denotes the nominal step interpolation distance, independent of tape velocity. A sequence of dibit correlator output signal samples is shown in FIG. 3.

Figure 6:
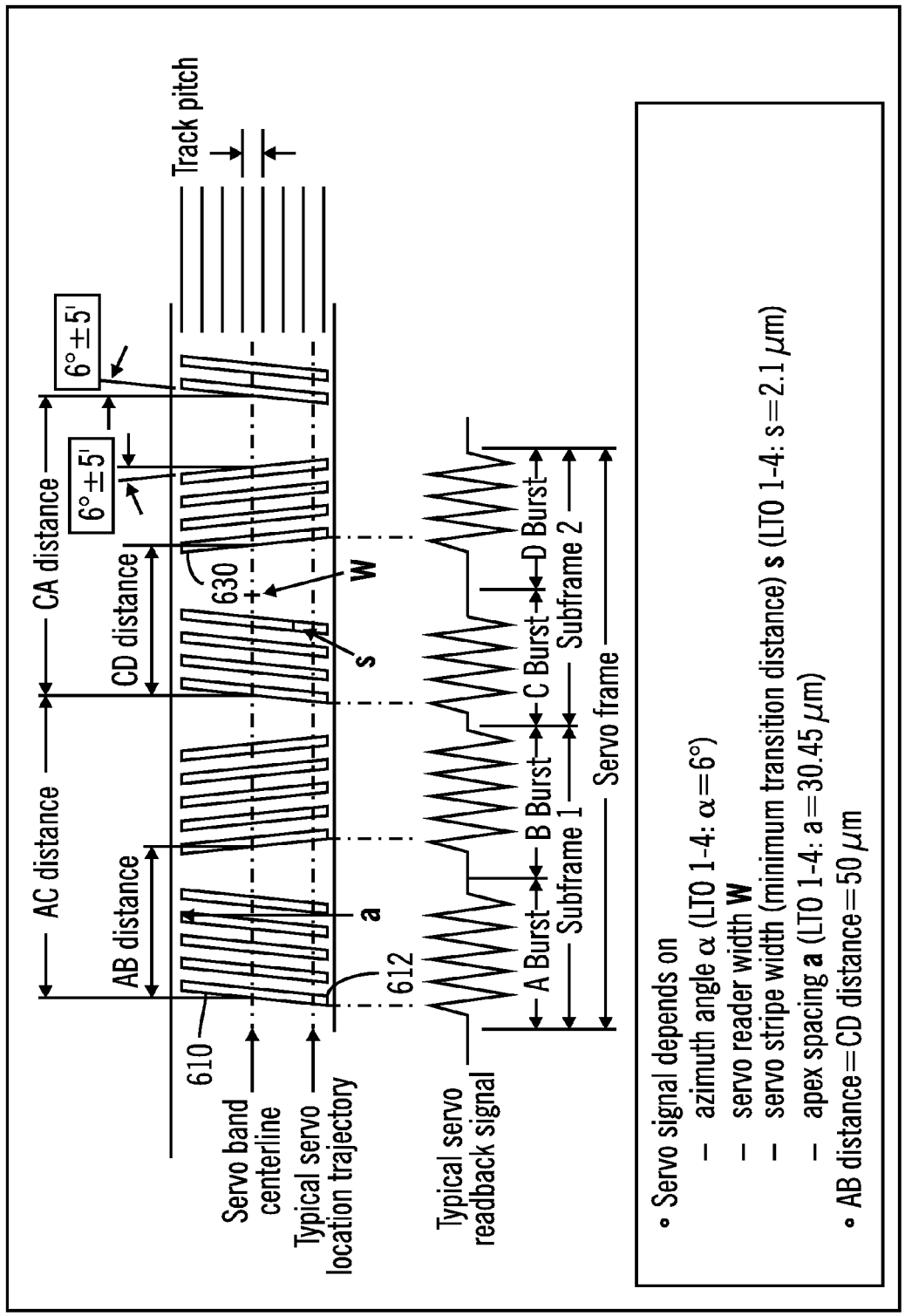
FIG. 6 illustrates an LTO servo frame in accordance with certain embodiments.
Figure 11:
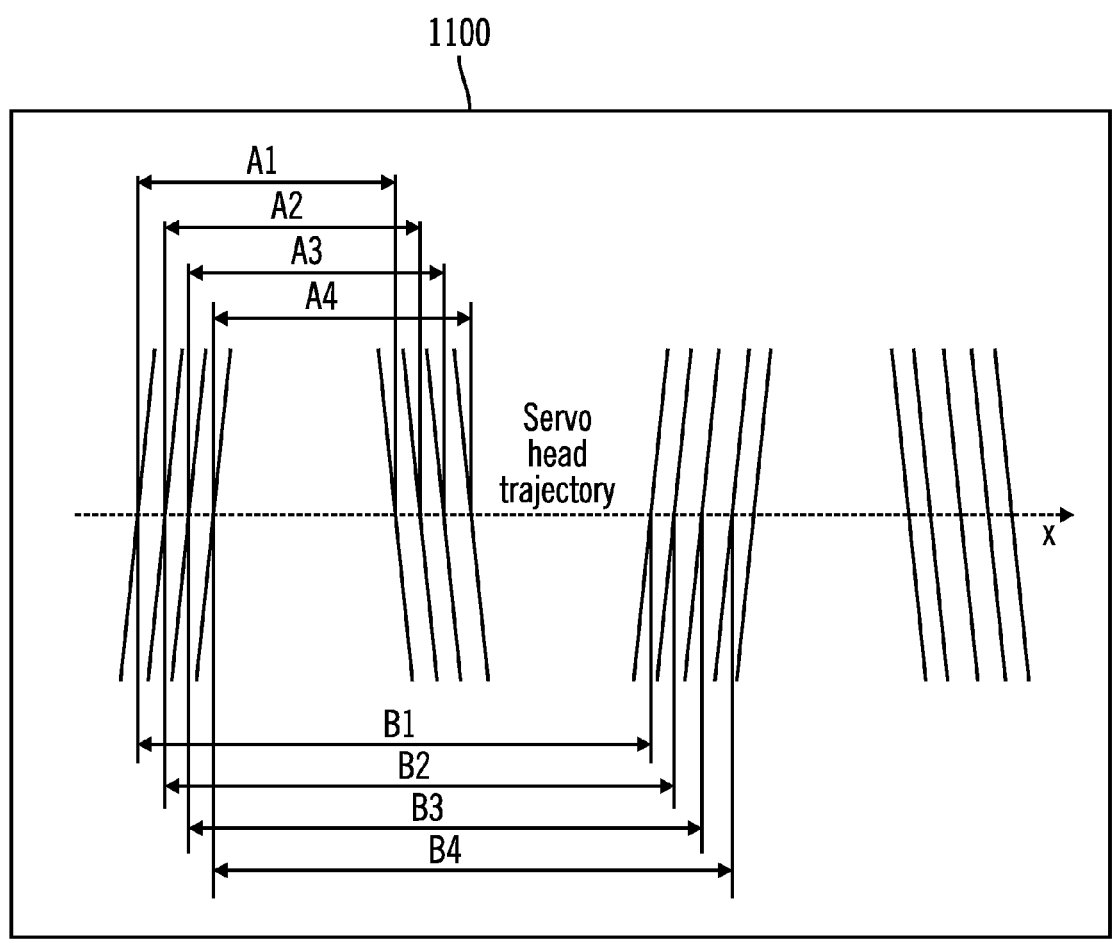
FIG. 11 illustrates intervals between peak-arrival times for the computation of tape velocity and servo reader y-position estimates in accordance with certain embodiments.

Moreover, the interpolator 214 and dibit correlator 230 approach provided by embodiments allows introducing more powerful schemes for the computation of estimates based on peak-arrival times or zero-crossing instants of the dibit correlator 230 output signal. That is, the peak-arrival time component 218 receives as input the dibit correlator 230 output correlation signal samples and the monitoring and control component 216 output control signals and uses these signals to compute a $yEst_{PAT}$ signal 240 and a $vEst_{PAT}$ signal 242, where the $yEst_{PAT}$ signal 240 may be described as an estimate of the servo reader y-position and the $vEst_{PAT}$ signal 242 may be described as an estimate of the tape velocity that are based on peak-arrival times, i.e., the instants at which peaks of the correlator output signal occur. As soon as a sequence of correlation peaks corresponding to the sequence of [4 4 5 5] peaks within a servo frame is detected, the tape velocity and reader y-position estimates are computed. The sequence of [4 4 5 5] peaks is characteristic of the sequence of C, D, A, and B servo bursts of a servo frame, as illustrated in FIG. 6 for LTO tape drives. Assuming the peak instants of the correlation signal samples, which are associated to the servo bursts, are considered for the computation of the tape velocity and reader y-position estimates, as illustrated in graph 1100 in FIG. 11, the desired estimates are given by $$yEst_{PAT} = -\frac{u}{2\tan\left(\frac{\pi}{30}\right)} \left( \frac{A1 + A2 + A3 + A4}{B1 + B2 + B3 + B4} - \frac{50}{u} \right), \quad (2)$$

and $$vEst_{PAT} = \frac{4u}{B1 + B2 + B3 + B4}, \quad (3)$$

respectively, where u=100 μm for forward tape motion and u=95 μm for reverse tape motion, and A1 to A4, B1 to B4 represent the lengths of the time intervals between respective peaks of the correlator output signal.

Also, the zero-crossing time component 220 receives as input the dibit correlator 230 output correlation signal samples and the monitoring and control component 216 output control signals and uses these signals to compute a $yEst_{ZC}$ signal 250 and a $vEst_{ZC}$ signal 252, where the $yEst_{ZC}$ signal 250 may be described as an estimate of the servo reader y-position and the $vEst_{ZC}$ signal 252 may be described as an estimate of the tape velocity that are based on zero-crossing times, i.e., the instants at which zero values of the correlator output signal occur. For the computation of estimates based on zero-crossing times, the expressions (2) and (3) are still valid, provided that A1 to A4, B1 to B4 represent the lengths of the time intervals between respective zero-crossings of the correlator output signal.

The LPOS detector 232 receives as input the dibit correlator 230 output correlation signal samples and uses these to output an LPOS metric 260 and a signal-to-noise plus distortion ratio (SDR) estimate 262. The optimum detection of LPOS symbols and concurrent monitoring of the reliability of the LPOS detection process is based on a metric, which for each binary LPOS symbol $a_l \in \{-1,+1\}$ yields the likelihood of the two hypotheses $H_{a_l=-1}$ and $H_{a_l=+1}$.

The encoding of LPOS symbols is obtained in LTO tape drives by applying PPM to the second and fourth dibit of the A and B bursts. Recalling the formulation of the optimum receiver for the detection of waveform signals from a given set in the presence of additive white Gaussian noise (AWGN), the expressions of the reader output signal r(t) and of the dibit signal pulse g(t), and assuming constant tape velocity, the metric associated to the likelihood of the hypothesis $H_{a_l=\eta}$, $\eta \in \{-1,+1\}$ can be expressed by $$m(r \mid a_l = \eta) = m_{a,l} \propto \int_{lT_F + \frac{T_F}{2} + \frac{y}{v\tan(\pi/30)} + \frac{T_d}{2}}^{lT_F + \frac{T_F}{2} + \frac{y}{v\tan(\pi/30)} + \frac{3T_d}{2}} \quad (4)$$

$$\left[r(t) - g\left(t - lT_F - \frac{y}{v\tan(\pi/30)} - (1-\xi\eta)T_d - \frac{T_F}{2}; v\right)\right]^2 dt$$

$$+ \int_{lT_F + \frac{T_F}{2} + \frac{y}{v\tan(\pi/30)} + \frac{5T_d}{2}}^{lT_F + \frac{T_F}{2} + \frac{y}{v\tan(\pi/30)} + \frac{7T_d}{2}}$$

$$\left[r(t) - g\left(t - lT_F - \frac{y}{v\tan(\pi/30)} - (3+\xi\eta)T_d - \frac{T_F}{2}; v\right)\right]^2 dt$$

$$+ \int_{lT_F + \frac{3T_F}{4} - \frac{y}{v\tan(\pi/30)} + \frac{T_d}{2}}^{lT_F + \frac{3T_F}{4} - \frac{y}{v\tan(\pi/30)} + \frac{3T_d}{2}}$$

$$\left[r(t) - g\left(t - lT_F + \frac{y}{v\tan(\pi/30)} - (1-\xi\eta)T_d - \frac{3T_F}{4}; v\right)\right]^2 dt$$

$$+ \int_{lT_F + \frac{3T_F}{4} - \frac{y}{v\tan(\pi/30)} + \frac{5T_d}{2}}^{lT_F + \frac{3T_F}{4} - \frac{y}{v\tan(\pi/30)} + \frac{7T_d}{2}}$$

$$\left[r(t) - g\left(t - lT_F + \frac{y}{v\tan(\pi/30)} - (3+\xi\eta)T_d - \frac{3T_F}{4}; v\right)\right]^2 dt,$$

where $T_F = L_F/v$, $T_D = L_D/v$, $L_F = 200$ μm, $L_D = 5$ μm, $v = v_x$ denotes the tape velocity, y the reader y-position, and $\xi = 0.05$. Introducing now the change of variables x=vt, defining $b_j = (a_j+1)/2$, $b_j \in \{0,1\}$, and the waveforms $s_\beta^{(j)}(x; y)$, for $\beta=0, 1$, j=1, 2, as $$s_\beta^{(j)}(x; y) = g\left(x + (-1)^j \frac{y}{\tan(\pi/30)} - (1 - \xi(2\beta-1))L_d; v = 1\right) + \quad (5)$$

$$g\left(x + (-1)^j \frac{y}{\tan(\pi/30)} - (3 + \xi(2\beta-1))L_d; v = 1\right)$$

and the expression of the metric (4) becomes $$m_{\beta,l} \propto \int_{lL_F + \frac{L_F}{2} + \frac{y}{\tan(\pi/30)} + \frac{L_d}{2}}^{lL_F + \frac{L_F}{2} + \frac{y}{\tan(\pi/30)} + \frac{3L_d}{2}} \left[r(x) - s_\beta^{(1)}\left(x - lL_F - \frac{L_F}{2}; y\right)\right]^2 dx + \quad (6)$$

$$\int_{lL_F + \frac{L_F}{2} + \frac{y}{\tan(\pi/30)} + \frac{5L_d}{2}}^{lL_F + \frac{L_F}{2} + \frac{y}{\tan(\pi/30)} + \frac{7L_d}{2}} \left[r(x) - s_\beta^{(1)}\left(x - lL_F - \frac{L_F}{2}; y\right)\right]^2 dx +$$

$$\int_{lL_F + \frac{3L_F}{4} - \frac{y}{\tan(\pi/30)} + \frac{L_d}{2}}^{lL_F + \frac{3L_F}{4} - \frac{y}{\tan(\pi/30)} + \frac{3L_d}{2}} \left[r(x) - s_\beta^{(2)}\left(x - lL_F - \frac{3L_F}{4}; y\right)\right]^2 dx +$$

$$\int_{lL_F + \frac{3L_F}{4} - \frac{y}{\tan(\pi/30)} + \frac{5L_d}{2}}^{lL_F + \frac{3L_F}{4} - \frac{y}{\tan(\pi/30)} + \frac{7L_d}{2}} \left[r(x) - s_\beta^{(2)}\left(x - lL_F - \frac{3L_F}{4}; y\right)\right]^2 dx.$$

Note that the expression of the metric (6) is independent of the tape velocity. Recalling that the time-base generation system provides the sequence of time instants $\{t_n\}$ such that the interpolated signal samples $\{r(t_n)\}$ are obtained at the fixed rate of $1/x_{int}$ samples per micrometer, independent of tape velocity, the metric may be computed in the digital domain as $$m_{\beta,l} = c(t_{\beta,l}^{(1)}) + c\left(t_{\beta,l}^{(1)} + (1 + \xi(2\beta-1))\frac{2L_D}{v}\right) + \quad (7)$$

$$c(t_{\beta,l}^{(2)}) + c\left(t_{\beta,l}^{(2)} + (1 + \xi(2\beta-1))\frac{2L_D}{v}\right),$$

where $t_{\beta,l}^{(1)}$ and $t_{\beta,l}^{(2)}$ denote the time instants for which in the hypothesis $H_{b_l=\beta}$ the expected contribution to the metric from the second dibit of the A burst and B burst, respectively, would be maximum. The optimum LPOS symbol detector computes the values $m_{\beta,l}$, $\beta=0,1$, and compares them to produce a decision $\hat{b}_l$ on the LPOS symbol encoded in the l-th servo frame, i.e., $$\hat{b}_l = \begin{cases} 0, & \text{if } m_{0,l} \geq m_{1,l} \\ 1, & \text{otherwise.} \end{cases} \quad (8)$$

Note that the optimum detection strategy outlined above is equivalent to matched filter detection. By using the metric adopted for hypothesis testing, a measure of the SDR associated with LPOS detection can be introduced, which allows monitoring of the LPOS detection process and of the reliability of the individual LPOS symbol decisions. Defining the quantities $M_C$ and $\sigma_{M_C}^2$ to denote the mean and the variance of the metric for the correct hypothesis, respectively, and $M_I$ and $\sigma_{M_I}^2$ to denote the mean and the variance of the metric for the incorrect hypothesis, respectively, the average signal-to-noise plus distortion ratio at the detection point is obtained as $$SDR = 20\log\left(\frac{|M_I - M_C|}{\sqrt{\sigma_{M_I}^2 + \sigma_{M_C}^2}}\right). \quad (9)$$

The interpolator 214 and dibit correlator 230 approach ensures that optimum filtering of the servo reader signal from the servo reader is performed, not only at constant tape velocity, but also during acceleration and deceleration. Optimum signal filtering is also achieved for the computation of the various estimates, independent of whether they are based on peak-arrival times or zero-crossing instants of the dibit correlator 230 output signal. With embodiments, the quality of the estimates, measured in terms of their standard deviations, depends on the parameters chosen for the definition of the servo patterns, which are azimuth angle alpha ($\alpha$) ($\alpha$=6 degrees for LTO drives of generations 1 to 4), servo reader width W, and servo stripe width s (minimum distance between magnetic transitions, s=2.1 µm (micrometers) for LTO-1 to LTO-4). Depending on the choice of the servo pattern parameters, the minimum standard deviation values of the reader y-position and tape velocity estimates are achieved either by monitoring the peak-arrival times or the zero-crossing instants of the servo reader signal. Therefore, another aspect of the invention is the possibility of optimally selecting servo-reader y-position and tape-velocity estimates, which are obtained by monitoring the peak-arrival times and/or the zero-crossing instants, depending on the choice of azimuth angle, servo reader width, and servo stripe width.

FIG. 3 illustrates a graph 300 showing dibit correlator output signal samples in accordance with certain embodiments. As an example, a dibit correlator peak is in the neighborhood of the signal sample represented by point 310. As another example, a zero crossing of the output signal of a dibit correlator is in the neighborhood of the signal sample represented by point 350. More accurate estimation of the peak-arrival times and of the zero-crossing instants of the correlator output signal may be obtained by considering the entire sequence of output signal samples rather than isolated samples.

Figure 4:
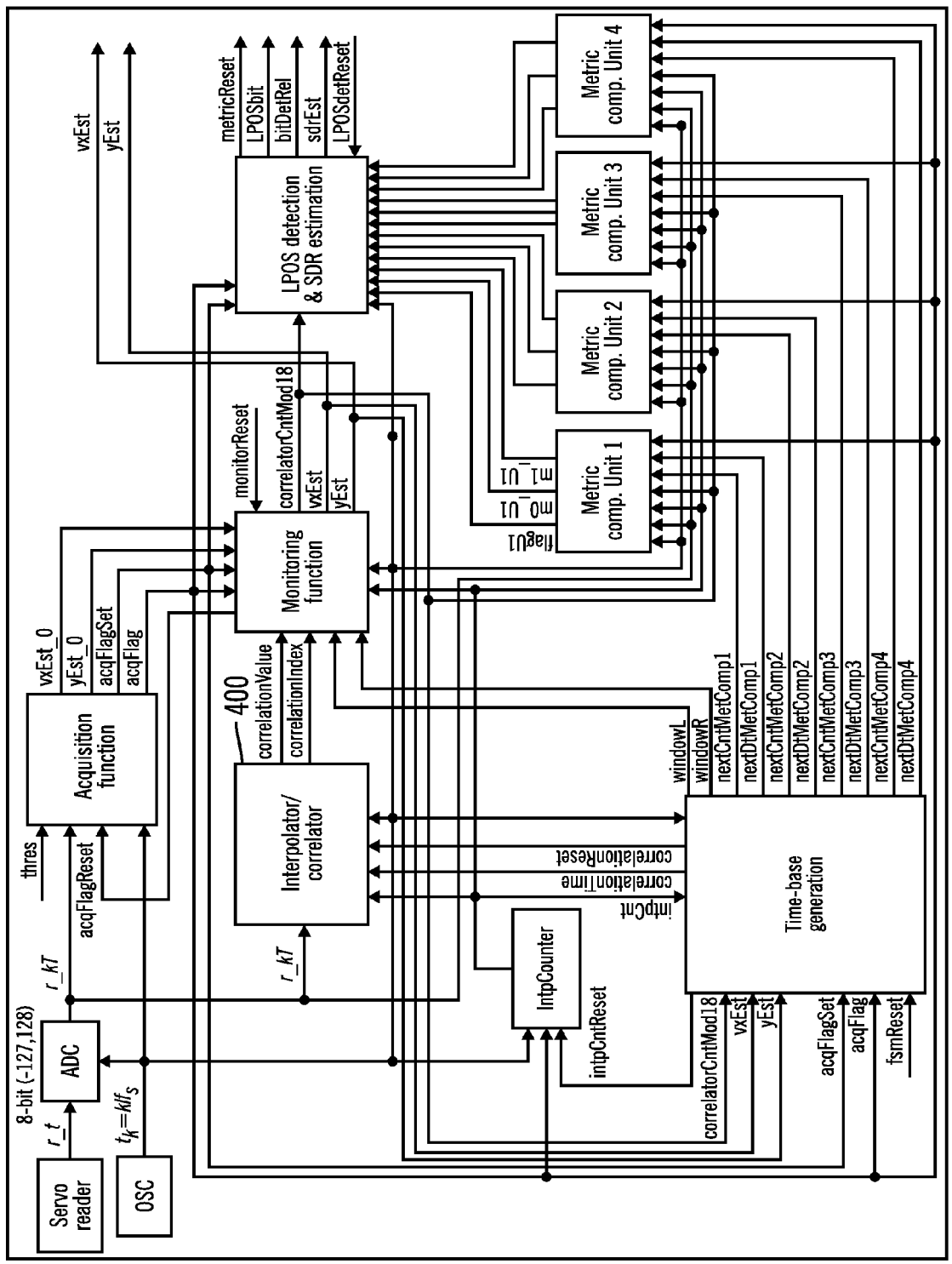
FIG. 4 illustrates further details of a servo channel architecture in accordance with certain embodiments.

FIG. 4 illustrates further details of a servo channel architecture in accordance with certain embodiments. In FIG. 4, the interpolator/correlator 400 provides the functionality of an interpolator and dibit correlator.

Figure 5:
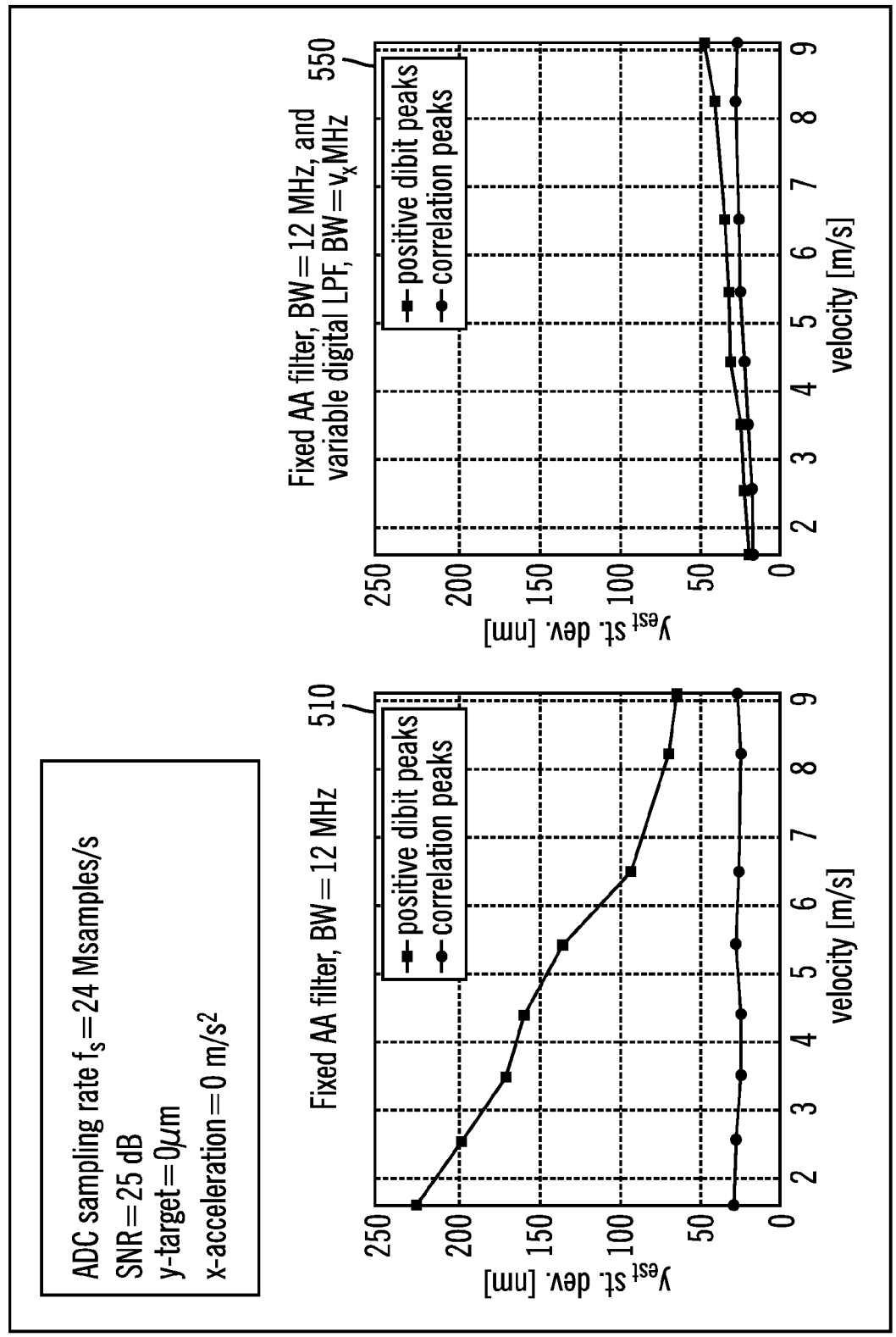
FIG. 5 illustrates open-loop performance of servo reader y-position estimate computation in accordance with certain embodiments.

FIG. 5 illustrates open-loop performance of servo reader y-position estimate computation in accordance with certain embodiments. For the illustration of FIG. 5, the ADC sampling rate is 24 Msamples/second, (where Msamples/second stands for $10^6$ samples per second), the signal-to-noise ratio (SNR) is 25 dB (decibels), the reader y-position target is 0 µm, and the acceleration of the tape in the longitudinal direction (x-acceleration) is 0 m/s² (meters per second squared). Graph 510 illustrates the standard deviation of the reader y-position estimate that is obtained by a prior-art technique considering positive dibit peaks and a technique according to embodiments of the invention considering correlation peaks for the computation of the estimate, whereby a fixed anti-aliasing (AA) filter prior to the ADC with a bandwidth of 12 MHz (megahertz) is considered in both cases. Graph 550 illustrates the standard deviation of the reader y-position estimate that is obtained by a prior-art technique considering positive dibit peaks and a technique according to embodiments of the invention considering correlation peaks for the computation of the estimate, where there is a fixed AA filter with a bandwidth of 12 MHz, and a variable-bandwidth digital LPF with a bandwidth of BW≈2 $v_x$/s≈$v_x$ MHz (where "$v_x$" denotes the tape velocity in m/s and s=2.1 µm).

FIG. 6 illustrates an LTO servo frame in accordance with certain embodiments. Magnetic transitions on the tape medium (e.g., 610, 612, 630) are represented by lines. A transition of the servo reader from a region where the medium is magnetized in a first direction to a region where the medium is magnetized in a second (opposite) direction generates a positive pulse (e.g., transition 610), whereas a transition of the servo reader from a region where the medium is magnetized in the second direction to a region where the medium is magnetized in the first direction (e.g., transition 612) generates a negative pulse. A dibit may be described as the sequence of a positive pulse followed by a negative pulse.

Figure 7:
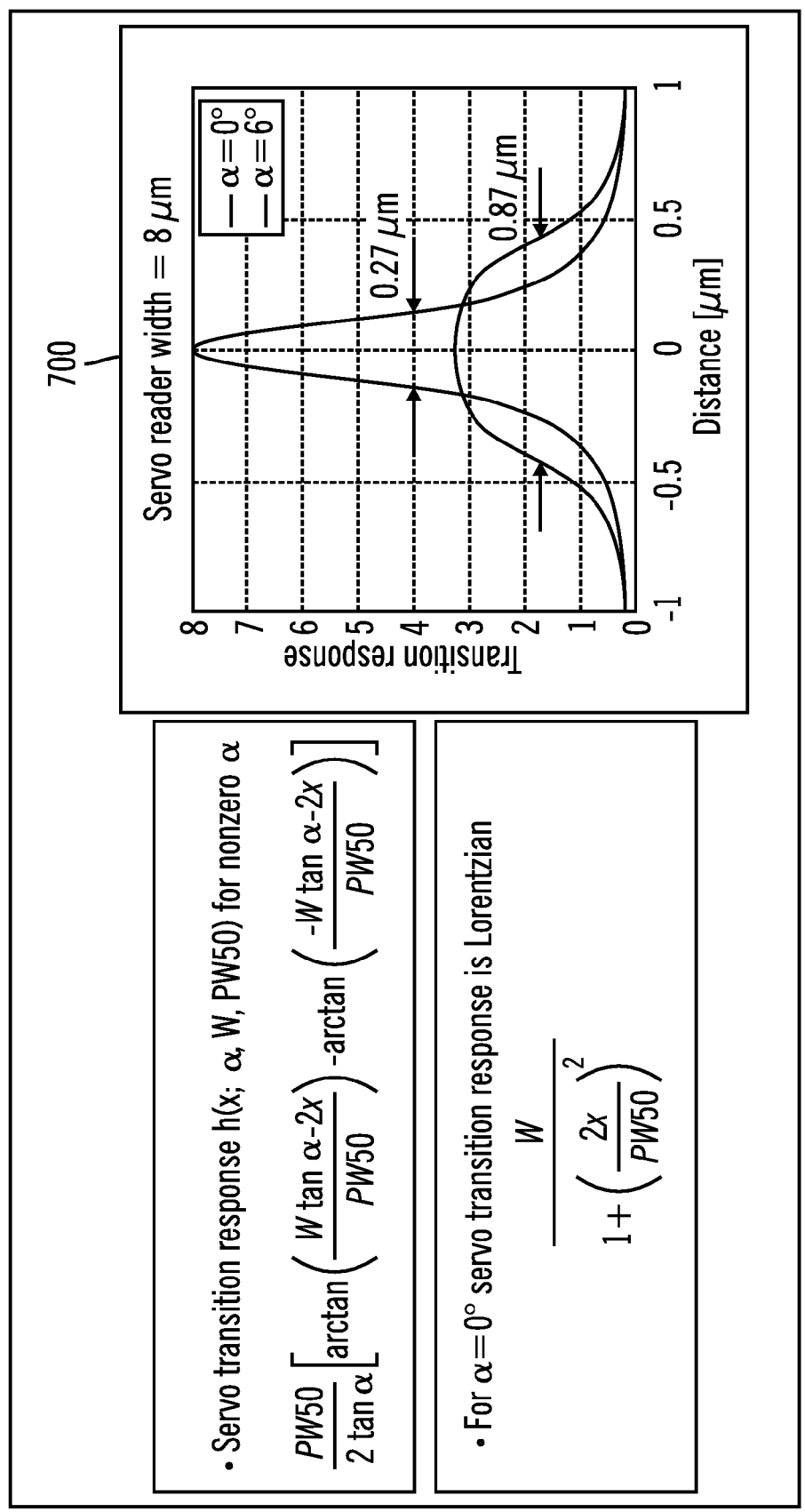
FIG. 7 illustrates a servo transition response model in accordance with certain embodiments.

FIG. 7 illustrates a servo transition response model in accordance with certain embodiments. The derivation of the servo transition response (at a distance x from the transition measured on the longitudinal direction parallel to the tape edge) is based on representing the servo stripe lines at azimuth angle alpha by a staircase function with infinitesimal step size dy and adding all contributions of time-shifted Lorentzian micro-responses for a given reader width W by linear superposition, i.e., by integration over the variable y where y is the displacement across the track (lateral direction perpendicular to the tape edge). The expression of the servo transition response is thus given by $$h(x; \alpha, W, PW50) = \qquad (10)$$
$$\frac{PW50}{2\tan\alpha}\left[\arctan\left(\frac{W\tan\alpha - 2x}{PW50}\right) - \arctan\left(\frac{-W\tan\alpha - 2x}{PW50}\right)\right].$$

Thereby PW50 denotes the pulse width at 50% of maximum amplitude for alpha=0, and it is assumed that the servo reader response for alpha=0 is the Lorentzian response. In FIG. 7, Graph 700 also illustrates the PW50 of servo transition responses that are obtained for alpha=0 (Lorentzian) and alpha=6 degrees, for a servo reader width W of 8 µm. Recalling that the minimum distance between transitions in servo bursts is equal to s, the dibit waveform is expressed as $$g(x) = h(x; \alpha, W, PW50) - h(x - s; \alpha, W, PW50). \qquad (11)$$

Figure 8:
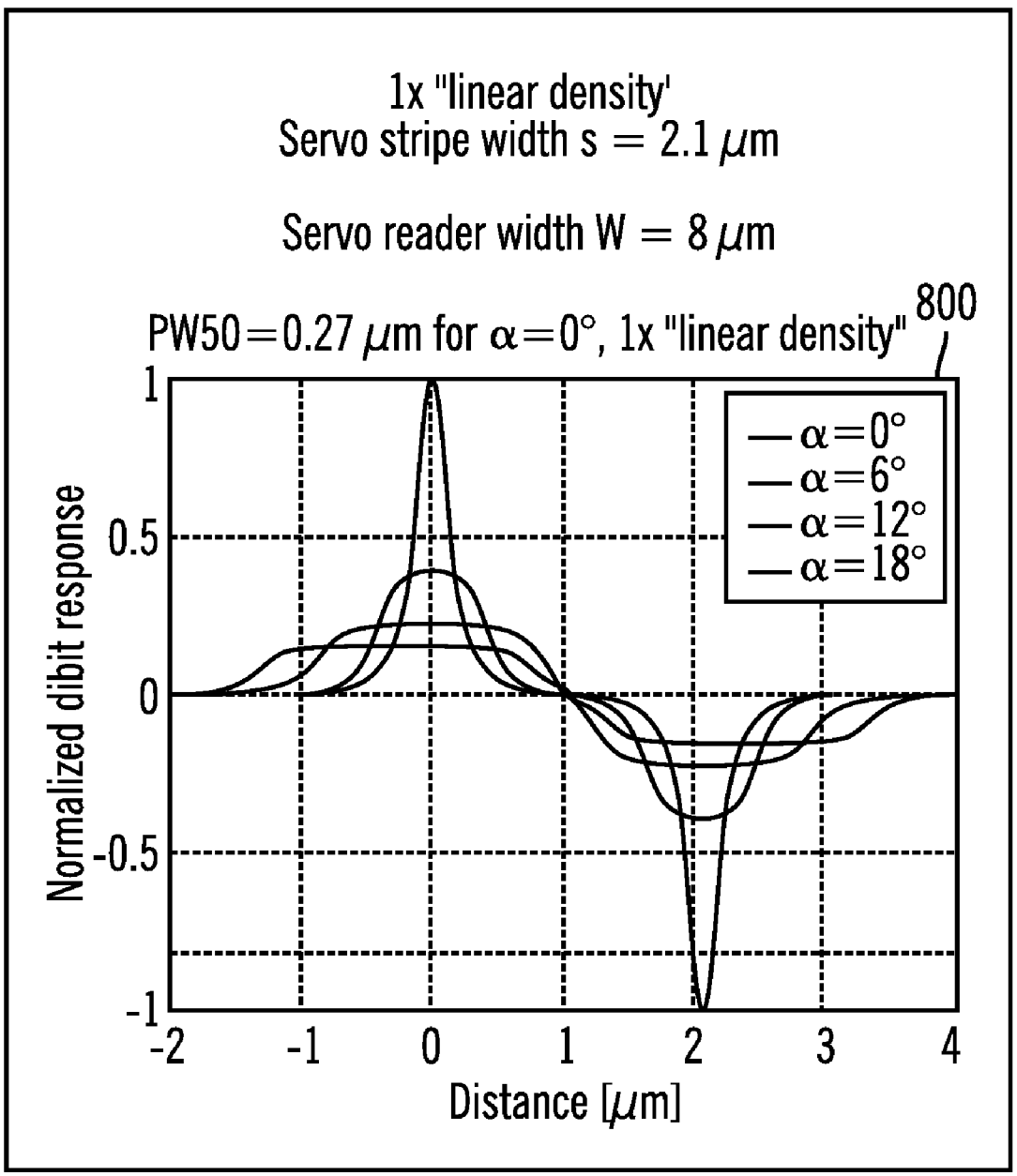
FIG. 8 illustrates a servo dibit response for 1× linear density in accordance with certain embodiments.

FIG. 8 illustrates servo dibit responses for 1× linear density in accordance with certain embodiments. The linear density of servo bursts is defined as the reciprocal of the minimum distance s between magnetic transitions. A linear density of 1× is defined here as the linear density, which is obtained for the LTO value of s=2.1 µm. Graph 800 represents a dibit response at 1× linear density for s=2.1 g/m, W=8 µm, and various values of the angle α. The PW50 of the pulse obtained for α=0 degrees is equal to 0.27 µm.

Figure 9:
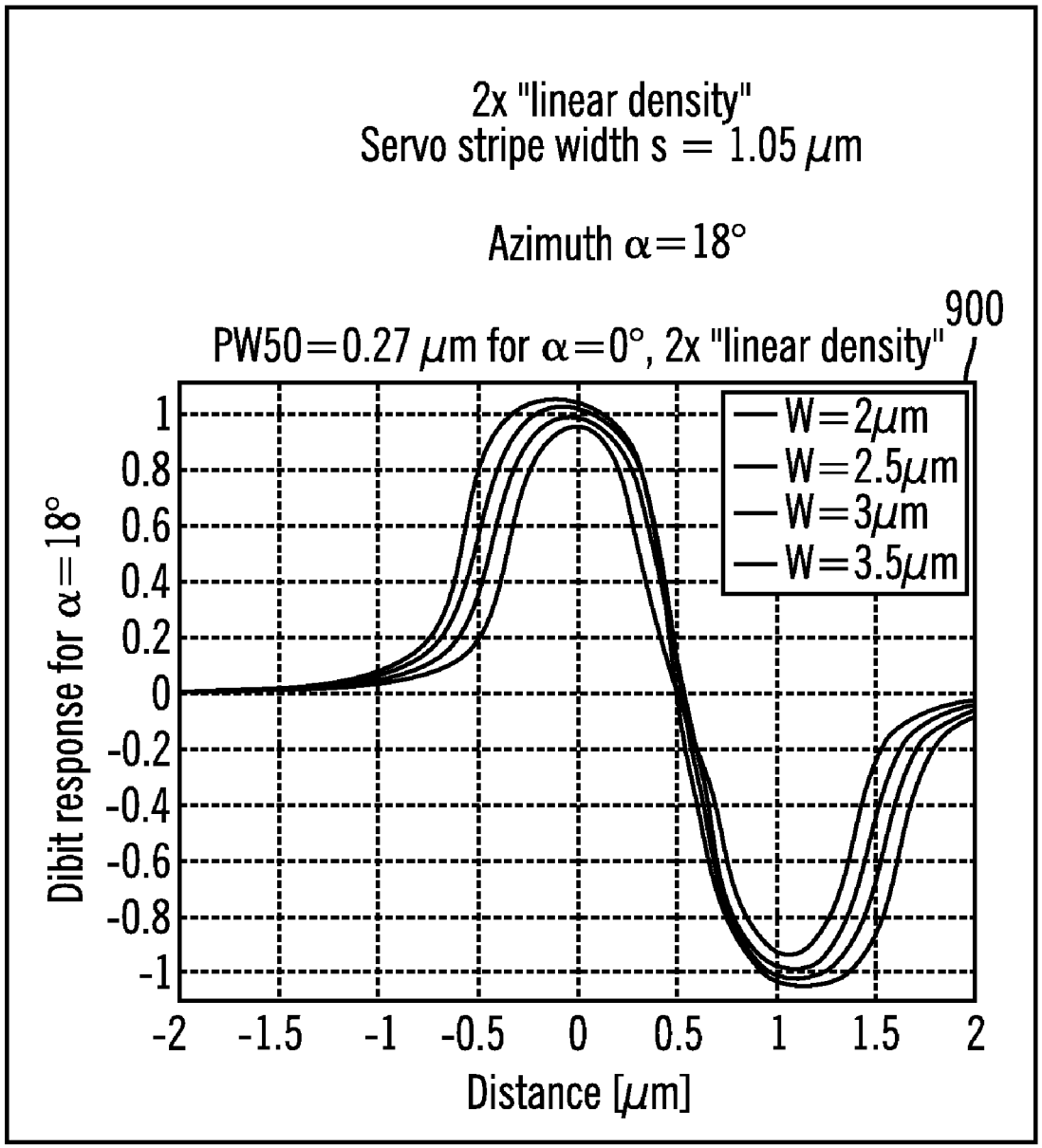
FIG. 9 illustrates a servo dibit response for 2× linear density in accordance with certain embodiments.

FIG. 9 illustrates a servo dibit response for 2× linear density, which is obtained for the value of s=1.05 µm, in accordance with certain embodiments. Graph 900 represents a dibit response at 2× linear density for s=1.05 µm, α=18 degrees, and various values of the servo reader width W. The PW50 of the pulse obtained for α=0 degrees is equal to 0.27 µm.

Figure 10:
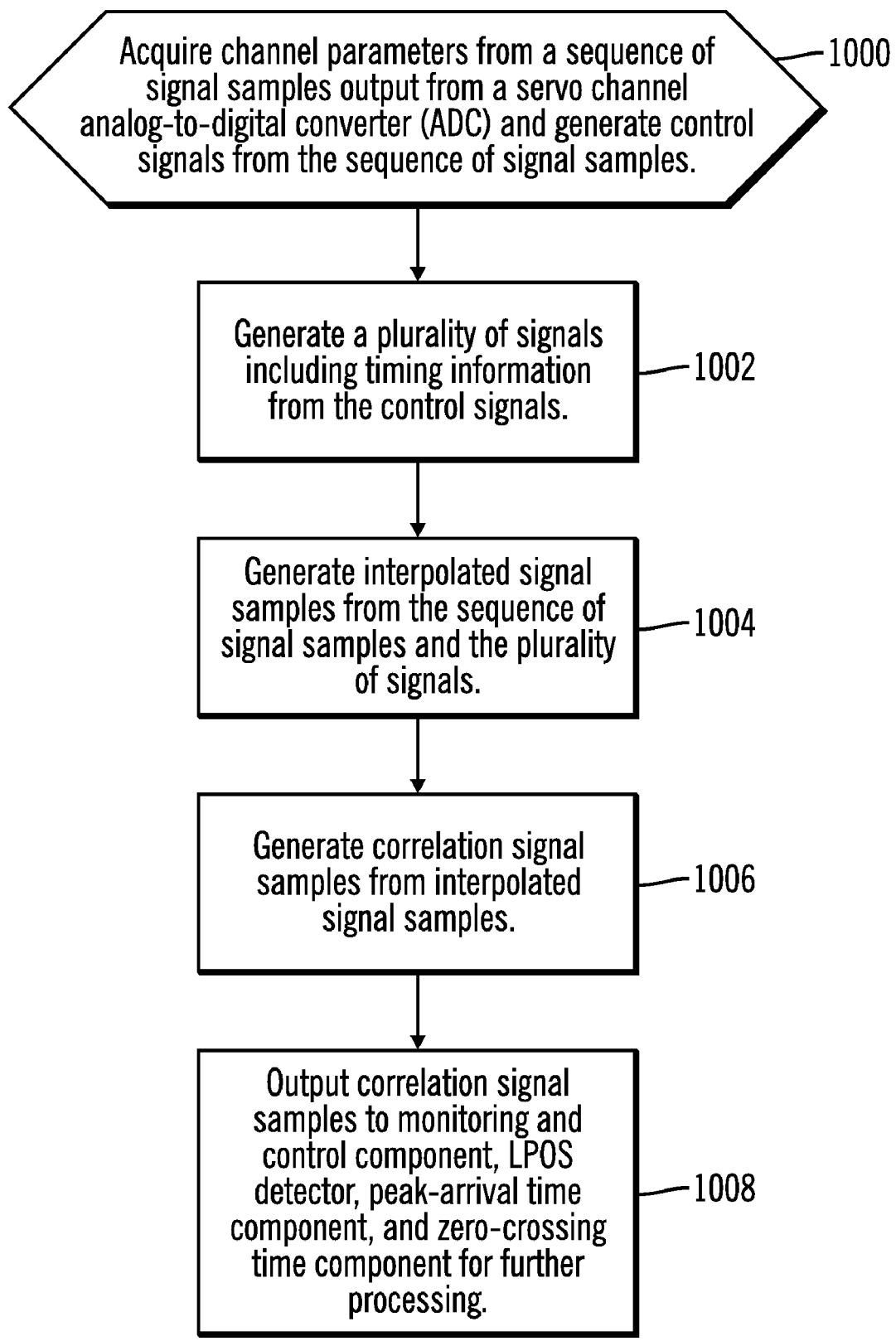
FIG. 10 illustrates a flow diagram of processing by a dibit correlator in accordance with certain embodiments.

FIG. 10 illustrates a flow diagram of processing by the dibit correlator 230 in accordance with certain embodiments. Control begins at block 1000, with the monitoring and control component 216 acquiring initial servo channel parameters from a sequence of signal samples output from a servo channel analog-to-digital converter (ADC) and generating control signals from the sequence of signal samples. In block 1002, the time-base generator 224 generates a plurality of signals including timing information from the control signals. In block 1004, the interpolator 214 generates interpolated signal samples from the sequence of signal samples output from the servo channel analog-to-digital converter (ADC) and the plurality of signals generated by the time-based generator 224. In block 1006, the dibit correlator 230 receives interpolated signal samples from the interpolator 214 and generates correlation signal samples according to expression (1). In block 1008, the dibit correlator 1004 outputs the correlation signal samples to the monitoring and control component 216, the LPOS detector 232, the peak-arrival time component 218, and zero-crossing time component 220 for further processing.

Figure 12:
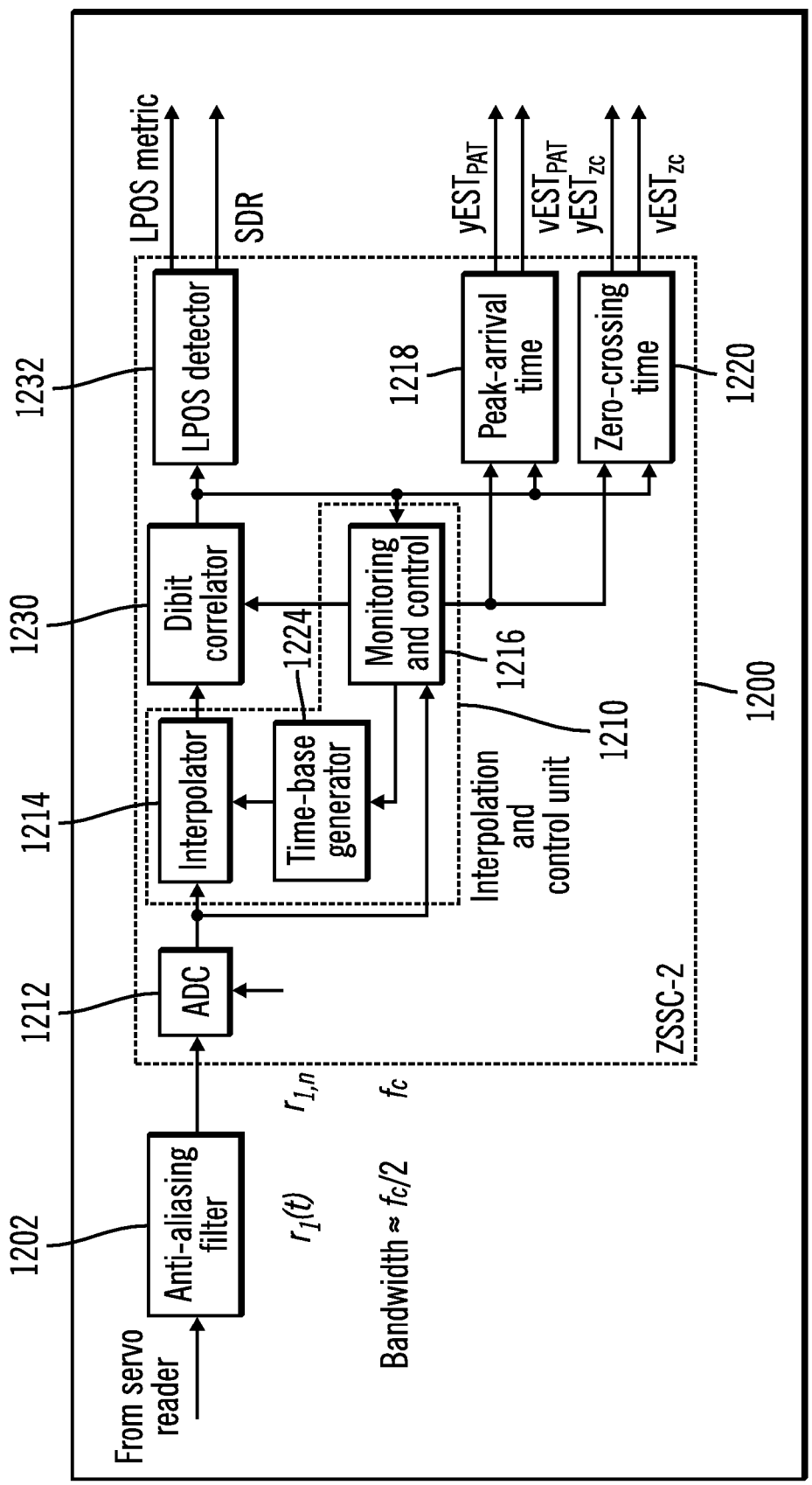
FIG. 12 illustrates a synchronous servo channel architecture with an interpolation and control unit and a dibit correlator in accordance with certain embodiments.

FIG. 12. illustrates a synchronous servo channel architecture with an interpolation and control unit 1210 and a dibit correlator 1230 in accordance with certain embodiments. The servo channel 1200 includes the interpolation and control unit 1210. The interpolation and control unit 1210 includes an interpolator 1214, a time-base generator 1224, and a monitoring and control component 1216. The interpolation and control unit 1210 is operable to output interpolated signal samples and control signals. The interpolation and control unit 1210 has a first input coupled to receive the signal samples from the ADC and a second input coupled to receive the correlation signal samples from the dibit correlator.

In certain embodiments, the components of FIG. 12 perform the same functionality as corresponding components of FIG. 2 (e.g., the LPOS detector 232 corresponds to LPOS detector 1232).

For example, in FIG. 12, an anti-aliasing filter 1202 receives input from a servo reader (not shown). The output of the anti-aliasing filter 1202 is routed to an ADC 1212 with a fixed clock frequency $f_c$ in the servo channel 1200. The output of the ADC 1212 is a sequence of signal samples that are routed to the interpolator 1214 and to the monitoring and control component 1216 in the interpolation and control unit 1210. The monitoring and control component 1216 processes the sequence of signal samples from the ADC 1212 at start-up to acquire initial parameters for proper operation of the servo channel 1200 in tracking mode, e.g., tape velocity and reader y-position estimates, as well as an initial instant for time-base generation. The output of the interpolator 1214 is a sequence of interpolated servo signal samples (also referred to as "interpolated signal samples") that are routed to a dibit correlator 1230. The output of the dibit correlator 1230 is a sequence of signal samples (also referred to as "correlation signal samples") that are routed to an LPOS detector 1232, a peak-arrival time component 1218, a zero-crossing time component 1220, and the monitoring and control component 1216. The monitoring and control component 1216 outputs control signals that are routed to the time-base generator 1224, the dibit correlator 1230, the peak-arrival time component 1218, and the zero-crossing time component 1220. The output of the time-base generator 1224 consists of a plurality of signals including timing information that are routed to the interpolator 1214. The dibit correlator 230 output is given by expression (1) above.

Thus, embodiments provide velocity-independent noise rejection for the servo channel of a tape drive. Embodiments provide velocity-independent filtering of servo-reader signals in tape drive systems.

ADDITIONAL EMBODIMENT DETAILS

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

The logic of FIG. 10 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 10 may be implemented in software, hardware, programmable and non-programmable gate array logic or in some combination of hardware, software, or gate array logic.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A synchronous servo channel for a data tape drive, comprising:
    a servo reader configured to read servo bursts from a data tape;
    an anti-aliasing filter operable to output a bandlimited signal and coupled to receive a servo channel signal comprising servo bursts from the servo reader;
    an analog-to-digital converter (ADC) operable to output signal samples and coupled to receive the bandlimited signal from the anti-aliasing filter;
    an interpolation and control unit operable to output interpolated signal samples and control signals, having a first input coupled to receive the signal samples from the ADC, and having a second input coupled to receive the correlation signal samples from the dibit correlator; and
    a dibit correlator operable to output correlation signal samples and coupled to receive the interpolated signal samples and control signals from the interpolation and control unit.

2. The synchronous servo channel of claim 1, wherein the interpolation and control unit further comprises:
    a monitoring and control component operable to output the control signals and having a third input coupled to receive the signal samples from the ADC, and a fourth input coupled to receive the correlation signal samples from the dibit correlator.

3. The synchronous servo channel of claim 1, wherein the interpolation and control unit further comprises:
    a time-base generator operable to output a plurality of signals including timing information and having an input coupled to receive the control signals from the monitoring and control component.

4. The synchronous servo channel of claim 1, wherein the interpolation and control unit further comprises:
    a servo channel signal interpolator having a third input coupled to receive the signal samples from the ADC and a fourth input coupled to receive the timing information from the time-base generator for the generation of interpolated servo signal samples.

5. The synchronous servo channel of claim 1, further comprising:
    a longitudinal position (LPOS) detector coupled to receive the correlation signal samples from the dibit correlator, having a first output to output an LPOS metric, and having a second output to output a signal-to-distortion ratio (SDR).

6. The synchronous servo channel of claim 1, further comprising:
    a peak-arrival time module having a first input coupled to receive the correlation signal samples from the dibit correlator, a second input coupled to receive the control signals from the interpolation and control unit, a first output to output an estimate of a servo reader y-position based on peak-arrival times, and a second output to output an estimate of a tape velocity based on the peak-arrival times.

7. The synchronous servo channel of claim 1, further comprising:
    a zero-crossing time module having a first input coupled to receive the correlation signal samples from the dibit correlator, a second input coupled to receive the control signals from the interpolation and control unit, a first output to output an estimate of a servo reader y-position based on zero-crossing times, and a second output to output an estimate of a tape velocity based on the zero-crossing times.

8. The synchronous servo channel of claim 1, wherein the dibit correlator output at time $t_n$ is generated using an expression and wherein the expression comprises:

$$c(t_n) = \sum_{i=0}^{N-1} r(t_{n-i}) g_{N-1-i},$$

where $\{r(t_n)\}$ is a sequence of interpolated signal samples, $\{t_n\}$ is a sequence of time instants provided by the interpolation and control unit, and $\{g_i\}_{i=0}^{N-1}$ is a sequence of length N representing a sampled reference dibit waveform.

9. The synchronous servo channel of claim 8, wherein the interpolation and control unit includes an interpolator and wherein generation of a time base for signal interpolation yields signal samples at an interpolator output at a predetermined fixed rate of $1/x_{int}$ samples per micrometer, wherein $x_{int}$ denotes a nominal step interpolation distance, independent of tape velocity.

10. The synchronous servo channel of claim 1, wherein a reference dibit waveform for generating correlation signal samples is expressed as $$g(x) = h(x; \alpha, W, PW50) - h(x-s; \alpha, W, PW50),$$

where s denotes a minimum distance between transitions in servo bursts, and a transition response $h(x; \alpha, W, PW50)$ is expressed as $$h(x; \alpha, W, PW50) = \frac{PW50}{2\tan\alpha}\left[\arctan\left(\frac{W\tan\alpha - 2x}{PW50}\right) - \arctan\left(\frac{-W\tan\alpha - 2x}{PW50}\right)\right],$$

where $\alpha$ is an azimuth angle of servo patterns, W is a servo reader width, and PW50 denotes a width of a transition response at 50% of maximum amplitude for $\alpha=0$.

11. A method for operating a synchronous servo channel for a data tape drive, comprising:

acquiring initial servo channel parameters from a sequence of signal samples output from a servo channel analog-to-digital converter (ADC) and generating control signals from the sequence of signal samples output from the servo channel analog-to-digital converter (ADC);

generating a plurality of signals including timing information from the control signals;

generating interpolated signal samples from the sequence of signal samples output from the servo channel analog-to-digital converter (ADC) and the plurality of signals; and generating correlation signal samples from the interpolated signal samples and the control signals.

12. The method of claim 11, further comprising:
generating a longitudinal position (LPOS) metric and a signal-to-distortion ratio from said correlation signal samples.

13. The method of claim 11, further comprising:
generating an estimate of a servo reader y-position based on peak-arrival times and an estimate of a tape velocity based on the peak-arrival times from the correlation signal samples and the control signals.

14. The method of claim 11, further comprising:
generating an estimate of a servo reader y-position based on zero-crossing times and an estimate of a tape velocity based on the zero-crossing times from the correlation signal samples and the control signals.

15. The method of claim 11, wherein correlation signal samples are generated using an expression at time $t_n$, comprising:

$$c(t_n) = \sum_{i=0}^{N-1} r(t_{n-i}) g_{N-1-i},$$

where $\{r(t_n)\}$ is a sequence of interpolated signal samples, $\{t_n\}$ is a sequence of time instants provided by the interpolation and control unit, and $\{g_i\}_{i=0}^{N-1}$ is a sequence of length N representing a sampled reference dibit waveform.

16. The method of claim 15, wherein generation of a time base for signal interpolation yields signal samples at an interpolator output at a predetermined fixed rate of $1/x_{int}$ samples per micrometer, and wherein $x_{int}$ denotes a nominal step interpolation distance, independent of tape velocity.

17. The method of claim 11, wherein a reference dibit waveform for generating correlation signal samples is expressed as $$g(x) = h(x; \alpha, W, PW50) - h(x-s; \alpha, W, PW50),$$

where s denotes a minimum distance between transitions in servo bursts, and a transition response $h(x; \alpha, W; PW50)$ is expressed as $$h(x; \alpha, W, PW50) = \frac{PW50}{2\tan\alpha}\left[\arctan\left(\frac{W\tan\alpha - 2x}{PW50}\right) - \arctan\left(\frac{-W\tan\alpha - 2x}{PW50}\right)\right],$$

where $\alpha$ is an azimuth angle of servo patterns, W is a servo reader width, and PW50 denotes a width of a transition response at 50% of maximum amplitude for $\alpha=0$.

18. A synchronous servo channel for a data tape drive, comprising:

a servo reader configured to read servo bursts from a data tape;

an anti-aliasing filter operable to output a bandlimited signal and coupled to receive a servo channel signal comprising servo bursts from the servo reader;

an analog-to-digital converter (ADC) operable to output signal samples and coupled to receive the bandlimited signal from the anti-aliasing filter;

an interpolation and control unit comprising:

a monitoring and control component operable to output control signals and coupled to receive the signal samples from the ADC;

a time-base generator operable to output a plurality of signals including timing information and coupled to receive the control signals from the monitoring and control component; and a servo channel signal interpolator having a first input coupled to receive the signal samples from the ADC and a second input coupled to receive the timing information from the time-base generator for generation of interpolated signal samples; and a dibit correlator operable to output correlation signal samples and having a first input coupled to receive the interpolated signal samples from the servo channel signal interpolator and a second input coupled to receive the control signals from the monitoring and control component.

19. The synchronous servo channel of claim 18, wherein the monitoring and control component has a first input coupled to receive the signal samples from the ADC and a second input coupled to receive the correlation signal samples from the dibit correlator.

20. The synchronous servo channel of claim 18, wherein a reference dibit waveform for generating correlation signal samples is expressed as $$g(x) = h(x; \alpha, W, PW50) - h(x-s; \alpha, W, PW50),$$

where s denotes a minimum distance between transitions in servo bursts, and a transition response $h(x; \alpha, W, PW50)$ is expressed as $$h(x; \alpha, W, PW50) = \frac{PW50}{2\tan\alpha}\left[\arctan\left(\frac{W\tan\alpha - 2x}{PW50}\right) - \arctan\left(\frac{-W\tan\alpha - 2x}{PW50}\right)\right],$$

where $\alpha$ is an azimuth angle of servo patterns, W is a servo reader width, and PW50 denotes a width of a transition response at 50% of maximum amplitude for $\alpha=0$.

* * * * *